April 12, 1927.

H. L. COOKE 1,623,998

PHOTOGRAPHIC SHUTTER

Filed June 22, 1918      4 Sheets-Sheet 1

INVENTOR
H. L. Cooke
BY
Edmund Quincy Moses
ATTORNEY

April 12, 1927.

H. L. COOKE 1,623,998

PHOTOGRAPHIC SHUTTER

Filed June 22, 1918    4 Sheets-Sheet 2

INVENTOR
H. L. Cooke
BY
Edmund Quincy Moses
ATTORNEY

April 12, 1927.

H. L. COOKE 1,623,998

PHOTOGRAPHIC SHUTTER

Filed June 22, 1918    4 Sheets-Sheet 3

INVENTOR
H. L. Cooke
BY
Edmund Garvey Moses
ATTORNEY

April 12, 1927.

H. L. COOKE 1,623,998

PHOTOGRAPHIC SHUTTER

Filed June 22, 1918

Patented Apr. 12, 1927.

1,623,998

UNITED STATES PATENT OFFICE.

HEREWARD LESTER COOKE, OF PRINCETON, NEW JERSEY, ASSIGNOR TO COOKE PATENTS INCORPORATED, OF NEW YORK, N. Y., A CORPORATION OF DELAWARE.

PHOTOGRAPHIC SHUTTER.

Application filed June 22, 1918, Serial No. 241,331, and in Great Britain March 27, 1914.

(GRANTED UNDER THE PROVISIONS OF THE ACT OF MARCH 3, 1921, 41 STAT. L., 1313.)

This invention relates to photographic shutters, and is adapted more particularly to the type which is provided with a variable diaphragm opening, and means for regulating the "speed" or duration of exposure.

In shutters of this type considerable knowledge and skill has been required on the part of the operator to enable the proper adjustments to be made to ensure a correct exposure under all conditions and it has also been necessary to make a plurality of adjustments for each exposure. In order to take care of the various factors affecting the duration of the exposure such as the actinic intensity of the light, the "speed" or sensitiveness to light of the sensitized surface, the diaphragm aperture and the focal adjustment, it has been necessary to make various calculations or to refer to tables. The present invention aims to overcome these difficulties and to provide mechanical means by which compensation is made automatically for the various factors involved and in which the required adjustment of the shutter to secure correct exposure under given conditions is accomplished with certainty and in the simplest possible manner. By the use of the invention the necessity of reference to tables and the making of calculations by the operator is eliminated as the calculation of and compensation for the various factors is performed mechanically by the instrument itself.

The general theory upon which the invention is based is as follows: It may readily be shown that to produce correct exposure of a photographic sensitized surface the conditions of exposure must conform approximately with the following equation:

$$I (TD^2/KNL^2) = I (T/KNF^2) = 1.$$

where I is the actinic intensity of the light entering the camera, T the duration of exposure, D the diameter of the diaphragm aperture, N a number directly proportional to the duration of correct exposure of the sensitized surface under certain specified conditions, L the distance from the diaphragm aperture to the sensitized surface, and K a numerical factor, depending on the units employed in measuring the other quantities involved in the equation. The quantity within the brackets, which will be referred to as the Equivalent exposure, must therefore be the reciprocal of the actinic intensity of the light passing through the diaphragm aperture, in order that correct exposure of the sensitized surface may be effected. Since all the quantities in the above equation, with the exception of I, may readily be determined with considerable accuracy, it follows that if I can be correctly estimated the problem of determining any proper adjustment of the shutter required to produce correct exposure becomes a matter of simple numerical calculation. The main object of the present invention is to enable correct adjustment of the shutter to be secured quickly and in a simple manner, the underlying mathematical principle of the more important features of the invention being that of multiplication and division by the mechanical addition and subtraction of logarithms, as employed in the operation of the common slide rule. Further objects are to render photographic shutters more efficient and satisfactory and simple in operation than heretofore. The particular nature of the improvements involved in the invention and various specific objects and advantages attained, will be brought out more fully in the course of the following description.

For the purpose of illustrating the nature of my invention, I have shown the same as applied to and embodied in a well-known commercial form of automatic shutter as a type, but the invention is not restricted to that type of shutter as it may be adapted to any other type of shutter, which will enable the objects in view to be accomplished. The particular structural embodiment of the invention shown in the drawings and described in the specification is also to be understood merely as illustrative of a preferred form of mechanism and various changes may be made therein to suit particular shutter structures or to accomplish particular results, as may be found necessary or desirable.

In the accompanying drawings.

The description of the present invention will be very much condensed and rendered more precise by employing the following terms which will be used in accordance with the definitions here given:—

*Logarithmic scale.*—A scale in which the separation between any two divisions is proportional to the arithmetical difference between the logarithms of the numbers corresponding to the said two divisions. The separation is to be measured as a distance or an angle according to whether the scale is straight or circular.

*Constant of logarithmic scale.*—The separation, linear or angular, between divisions corresponding to numbers having the ratio 2:1. The constant is reckoned positive when increasing numbers occur in travelling from left to right in linear scales, or in clockwise direction in circular scales: and vice versa.

*Logarithmic motion.*—A member is said to move in a logarithmic manner with respect to a variable quantity when its position depends on the value of the said variable quantity, and the separation, linear or angular, between any two positions of the said member is proportional to the arithmetical difference between the logarithms of the two values of the said variable quantity corresponding to the two said positions of the said member.

*Constant of logarithmic motion.*—The separation, linear or angular, between two positions of a member having a logarithmic motion with respect to a variable quantity, the values of the variable quantity corresponding to the two said positions of the said member having the ratio 2:1. The constant is reckoned positive in the case of linear motion when motion from left to right corresponds to increasing values of the variable quantity: is reckoned positive in the case of angular motion when a clockwise motion of the movable member corresponds to increasing values of the variable quanty: and vice versa.

It is not deemed necessary to illustrate and describe in detail the characteristics of the particular type of shutter shown as these are well known and a full description of the shutter is to be found in United States Patent No. 853,000 granted May 7, 1907 to Frank A. Brownell. The general characteristics of the shutter are that it has means for controlling the speed of operation so as to produce variable automatically timed exposures and that it also has mechanism by which the shutter may be actuated to produce "bulb" and "time" exposures, the control of the automatically timed exposures and the setting of the shutter mechanism to cause it to produce "bulb" and "time" exposures being effected by the movement of a single regulator. The shutter also has adjustable apertures forming means in the shape of an iris diaphragm.

Referring to the drawings and particularly to Figures 1 to 6 the general features of the shutter illustrated comprise a casing 1, including a cylindrical side wall 2, back 3, face plate 4, intermediate plate 5 and dust guard 6. Between the intermediate plate 5 and the back of the casing are mounted the shutter blades 7. In the type of shutter illustrated, two devices for actuating the shutter to cause an exposure are provided, one consisting of a cylinder shown at 8 in Figures 1 and 6 in which works a piston (not shown) which operatively engages a lever 9 (Figure 3) connected through suitable mechanism to the shutter blades. The usual rubber tube and bulb (not shown) are connected to the cylinder 8 for producing pressure to operate the piston. The shutter is also provided with a finger piece 10 pivoted at 11 and having a notch 12 engaging the end of the lever 13, the other end of which engages a pin 14 which is carried by the lever 9. The operation of the finger piece 10 will, therefore, also actuate the shutter. The mechanism by which the shutter blades are actuated is that employed in the shutter particularly described in Patent No. 853,000 above referred to and need not therefore be particularly described herein. The means employed in this shutter for securing variable automatically timed exposures, comprise a fluid check cylinder or dash pot 15 in which works a piston (not shown) which is actuated by the lever 16 (see Figure 3), the resistance thus caused acting on the shutter operating devices through linkage as described in said Patent No. 853,000 so as to delay the closing of the shutter. The extent of retarding action is varied by movement of a bell-crank lever 17. The adjustment of the shutter mechanism to produce "bulb" or "time" exposures is brought about by the movement of a link 18 which causes certain stops to be brought into operative position as described in said patent. The lever 17 and link 18 are pivoted together at 19 and to this pivotal point is connected an operating link 23, the movements of which will determine the duration of automatically timed exposures and will also bring about the adjustment of the shutter mechanism to produce "bulb" or "time" exposures. All of the construction thus far described corresponds in form and action to the mechanism described in said Patent No. 853,000 and no further description thereof is deemed necessary.

The first feature of the present improvement to be described comprises the means for controlling the shutter actuating mechanism, which is accomplished by the movement of the link 23. The mechanism is as follows:

A bracket 24 (Figures 3 and 5) is rigidly attached to the inner surface of the cylindrical casing 2. An adjustable plate 25 is pivoted at 26 to the bracket 24, and is connected by means of a pivot 27 to the link 23. The said adjustable plate 25 and an oscillatory plate 28, mounted so that it may be turned about the dustguard 6, cooperate through the medium of a pin or stud 30 on the adjustable plate 25 and a slot 31 formed in an extended portion of the oscillatory plate 28, in which slot the said pin or stud 30 engages.

The said slot 31 comprises three portions, $31^a$—$31^b$, $31^b$—$31^c$, and $31^a$—$31^d$, which are produced preferably as now described. Arrange the adjustable plate 25 in the position shown in Fig. 3, and make the link 23 of such a length that this position of the adjustable plate 25, which controls the position of the said link 23, shall correspond with that adjustment of the time regulating mechanism of the shutter which will result in automatically timed exposures of the greatest duration which the said time regulating mechanism of the shutter is capable of controlling. Call the duration of this exposure $T^1$. Now place the oscillatory plate 28 in the position shown in Fig. 3, with the slot 31 still uncut, and mark on the plate 28 the position of the stud 30. This position on the plate 28 will be referred to as position $P_1$. Now rotate the adjustable plate 25 about the pivot 26 in a counter-clockwise direction until the speed control mechanism is adjusted to give an automatically timed exposure of duration $T^1/2$, that is one-half of the duration of the first exposure. Now rotate the oscillatory plate 28 in a clockwise direction through an angle A, say about 5°, mark on the plate 28 the position of the stud 30, and call this position $P_2$. Now rotate the adjustable plate 25 about the pivot 26 in a counter-clockwise direction until the speed control mechanism is adjusted to give an automatically timed exposure of duration $T_1/4$. Then rotate the oscillatory plate about the dustguard 6 in a clockwise direction through a further angle A, so that its position differs from its original position $P_1$ by an angle 2A, and mark on the said oscillatory plate 28 the position of the stud 30, and call this position $P_3$. Continue this process, locating positions $P_4$, $P_5$, etc., corresponding to adjustments of the plate 25 which will give automatically timed exposures of durations $T_1/8$, $T_1/16$, etc., the last of these positions located corresponding to the shortest of this series of durations of automatically timed exposures which the speed control mechanism is capable of effecting. Now cut the slot portion $31^a$—$31^b$, with the smooth curve, drawn through the positions $P_1$, $P_2$, etc., lying evenly along the axis of said slot portion. This slot portion $31^a$—$31^b$ now has the desired form. Since the stud 30 travels in the slot 31, the angular position of the adjustable plate 25 may be controlled by adjusting the position of the oscillatory plate 28, and the speed control thus depends on the angular position of the oscillatory plate 28. It will be seen that the form of the slot portion $31^a$—$31^b$ results in the plate 28 having a logarithmic motion with respect to the variable speed setting of the speed control mechanism over that range over which the stud 30 travels in the slot portion $31^a$—$31^b$. The angular constant of the said logarithmic motion is —A. Of course, the form of slot required to produce the stated results in any particular type of shutter having been once determined in the manner set forth or in any other suitable manner, the construction may be reproduced in quantities by any appropriate manufacturing process.

Figure 3:
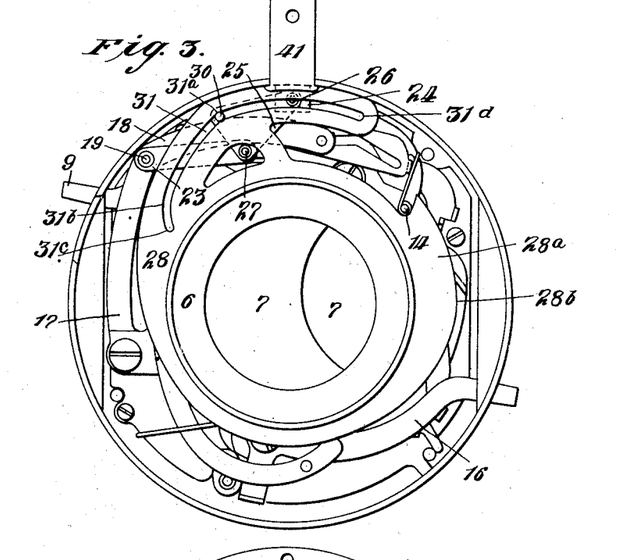
Figure 3 is a front view of the shutter with the cover or front plate, parts carried by said plate and certain other parts omitted, so as to illustrate particularly a part of the speed regulating mechanism.

The slot portion $31^a$—$31^b$ is now continued over the range $31^b$—$31^c$, to permit the speed regulation of the shutter to be set for "bulb" and "time" exposures. The precise form of the slot portion $31^b$—$31^c$ is not important with respect to the present invention, so long as it is of such a character as to cause the link 23 to move so as to bring the shutter controlling devices into position to produce "bulb" and "time" exposures.

Now continue the slot 31 from the point $31^a$ to $31^d$ along the arc of a circle having the central axis of the shutter as a centre. This concentrically produced slot portion increases the usefulness of the mechanism by enabling it to be employed for the calculation of the duration of "bulb" and "time" exposures, as will be explained later.

Figure 4:
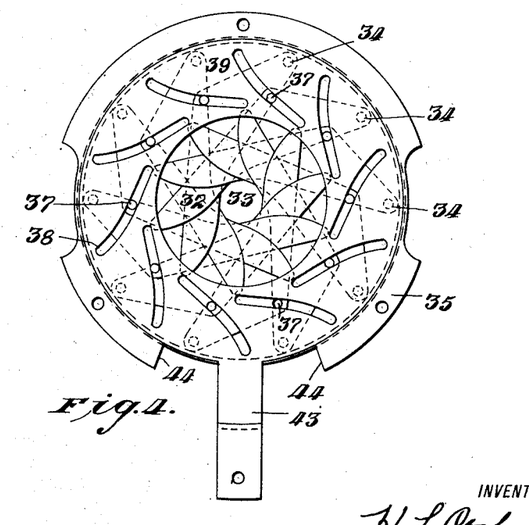
Figure 4 is a view showing the preferred arrangement of the diaphragm leaves, diaphragm adjusting ring and diaphragm casing.
Figure 11:
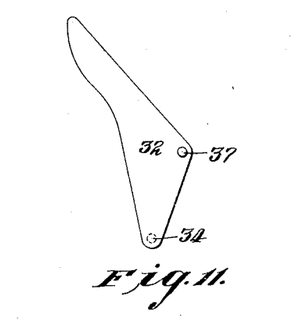
Figure 11 is a detail view of a preferred form of diaphragm leaf.

Leaving the speed mechanism for the present, reference will now be had more particularly to Figures 4 and 11, illustrating part of the diaphragm mechanism, comprising overlapping leaves 32 which are so constructed and arranged as to provide a variable diaphragm aperture 33. The diaphragm leaves under the present invention are desirably, but not necessarily, of approximately the form shown in Figures 4 and 11. The diaphragm leaves are arranged in an overlapping manner as shown, and are pivoted at 34 to the diaphragm casing 35, (Figures 4, 5 and 6) which has an opening 36 to which the said diaphragm leaves are rendered adjustable. To the latter end the diaphragm leaves are provided with pins or studs 37 which engage in slots 38 in the rotatable adjusting ring 39. The diaphragm leaves are placed in the space between the back 3 of the main casing 1 of the shutter and the diaphragm casing 35.

The preferred manner of laying out the slots 38 in the rotatable adjusting ring 39 is as follows: The overlapping diaphragm leaves 32, pivoted at 34 to the diaphragm casing 35, are first adjusted so that the area of the diaphragm aperture 33 has its maximum value. The rotatable adjusting ring 39, with the slots 38 still uncut, is then placed in position over the diaphragm leaves, and the positions of the studs 37 are marked on the said rotatable adjusting ring. Call these positions $p^1$, $p^{1'}$, $p^{1''}$, etc. Now rotate all the diaphragm leaves in an equal manner about their pivots 34 until the area of the diaphragm aperture is ½ the maximum value previously referred to. Then rotate the rotatable adjusting ring 39 in a counterclockwise direction through an angle A, this angle A being the same as that considered and similarly designated in determining the form of the slot portion $31^a$—$31^b$ in the oscillatory plate 28. Then mark on the rotatable adjusting ring 39 the positions now occupied by the studs 37, and call these positions $p^2$, $p^{2'}$, $p^{2''}$, etc. Now rotate the diaphragm leaves about their pivots 34 in an equal manner until the area of the diaphragm aperture is ¼ the maximum value previously referred to. Then rotate the rotatably adjusting ring 39 in a counterclockwise direction through a further angle A, so that its angular position now differs from its original angular position, in accordance with which the positions $p^1$, $p^{1'}$, $p^{1''}$, etc. were located, by an angle 2A. Then mark on the rotatable adjusting ring 39 the positions now occupied by the studs 37, and call these positions $p^3$, $p^{3'}$, $p^{3''}$, etc. Continue this process until the smallest aperture for which the diaphragm has been reached in the series, positions $p^4$, $p^{4'}$, $p^{4''}$ ..., $p^5$, $p^{5'}$, $p^{5''}$ ..., etc., being located, corresponding to areas of the diaphragm aperture equal to ⅛, 1/16, etc. of the maximum area previously referred to, and to positions of the rotatable adjusting ring 39 which correspond to angular displacements 3A, 4A, etc., measured in a counterclockwise direction from the original position of the rotatable adjusting ring 39, in accordance with which position the points $p^1$, $p^{1'}$, $p^{1''}$, etc., were located. A series of smooth curves are then drawn on the rotatable adjusting ring 39 passing through the position $p^1$, $p^2$, $p^3$ ..., $p^{1'}$, $p^{2'}$, $p^{3'}$, ..., etc. Slots are then cut in the rotatable adjusting ring 39 having these smooth curves as axes, and these slots have the desired form.

It will be seen that the form of the slots 38 in the rotatable adjusting ring 39, determined in the manner described above, will result in the said rotatable adjusting ring 39 having a logarithmic motion with respect to the variable area of the diaphragm aperture, the constant of the said logarithmic motion with respect to the said area of diaphragm aperture being $+A$. (It should be noted that while the constant of the said logarithmic motion with respect to the area of the said diaphragm aperture is $+A$, the constant of the said logarithmic motion with respect to the $f$-value of the said diaphragm aperture will be $-2A$, since the area of the diaphragm aperture is inversely proportional to the square of the $f$-value. Also that the constant of the said logarithmic motion with respect to the U. S. values of the diaphragm apertures will be $-A$, since the U. S. values of diaphragm apertures are inversely proportional to the areas of the apertures.)

Figure 5:
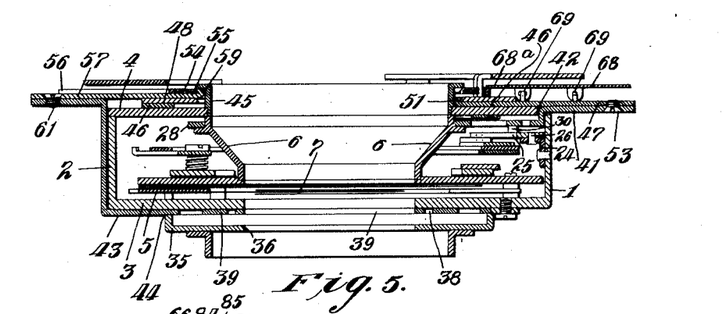
Figure 5 is a vertical central section of the shutter, parts being omitted.
Figure 6:
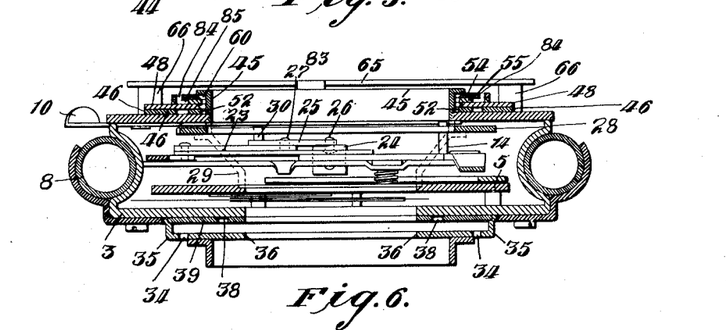
Figure 6 is a horizontal central section of the shutter, parts being omitted.

Taking up now the devices for manipulating the shutter speed controlling and diaphragm actuating rings and referring particularly to Figures 3 and 5, it will be seen that the adjustable plate 28 has an extended portion of arm 41, bent as indicated in Figure 5. The face plate 4 is cut away at the edge at 42, allowing the said arm 41 to project beyond the casing of the shutter, and to be rotated about the dustguard 6. By means of the projecting arm 41 the position of the oscillatory plate 28 may be adjusted from the outside of the shutter. Similarly, referring to Figures 2, 4 and 5, the diaphragm adjusting ring 39 has a projecting arm 43, bent as indicated in Figure 5. The diaphragm casing 35 is cut away at 44, allowing the arm 43 to project beyond the casing of the shutter, and permitting the adjusting ring 39 to be rotated. By means of the arm 43 the angular position of the adjusting ring 39 may be controlled from the outside of the shutter.

Figure 7:
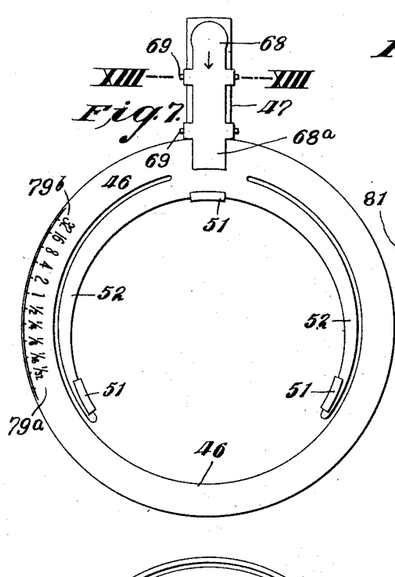
Figures 7, 8, 9 and 10 are detail views in elevation of different adjustable ring members carried on the face plate of the shutter.
Figure 8:
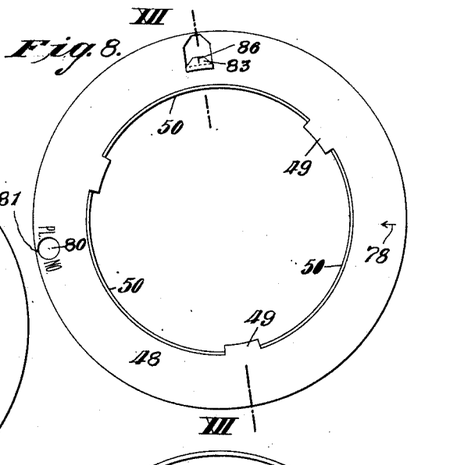

Passing now to the outside of the shutter, (Figs. 1, 5 and 6) a collar 45 is screwed into the face plate 4, and acts as an annular bearing for certain rotatable members, which will be described. A member 46, (Figs. 5, 6 and 7) consisting essentially of a flat ring with a projecting arm 47, is placed immediately above and in contact with the face plate 4. A member 48, preferably of the form shown in Figs. 8 and 12 lies above and in contact with the member 46. The member 48 has three projections 49 which lie in light contact with the collar 45, and keep the member 48 concentric with the said collar. The inner edge of the member 48 has bevelled portions 50, lying between the projections 49. The member 46 has three hooks 51, bent as indicated in Fig. 5, two of which are carried at the extremities of prongs 52 (Fig. 7). By bowing-in the prongs 52 the hooks 51 may be made to engage with the bevelled edges 50, the resulting outwardly directed tension on the said prongs causing the hooks 51 to grip the bevelled edges 50 firmly, thus holding the two members 46 and 48 in the same relative position unless considerable force is applied to alter the relative angular adjustment of the said two members by causing the hooks 51 to slide along the bevelled edges 50. The arm 47 is rigidly attached to the arm 41 by means of the screw 53, (Fig. 5), these two arms, when thus attached, constituting the speed regulator of the shutter.

Figure 9:
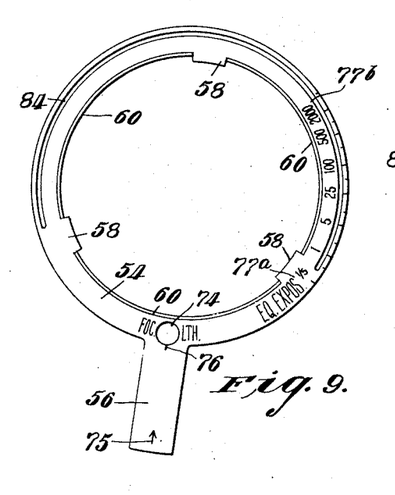
Figure 10:
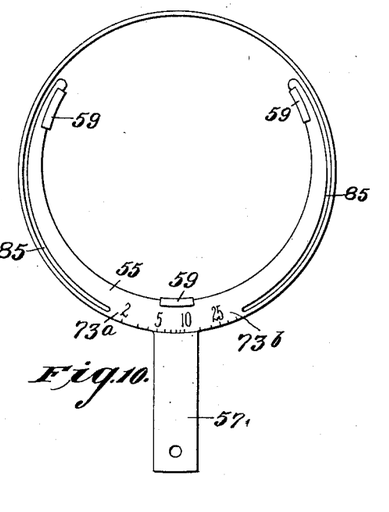

The two members 54 and 55, preferably of the form indicated in Figs. 9 and 10 respectively, consist essentially of flat rings with propecting arms 56 and 57. The said members 54 and 55 lie in contact with each other, and the member 55 lies in contact with the member 48. The member 54 is maintained concentric with the collar 45 by means of the projections 58, and the two members 54 and 55 are normally maintained in the same relative angular position by means of a friction device consisting of hooks 59 on spring prongs of the member 55 travelling on bevelled edges 60 of the member 54, this device being similar to that employed in maintaining fixed the relative angular positions of the members 46 and 48. The arm 57 is rigidly secured to the arm 43 by means of the screw 61 (Fig. 5) and the said two arms 57 and 43 when thus secured constitute the diaphragm regulator of the shutter.

The diaphragm scale plate 62 (Fig. 1) is supported in a raised position above the face plate 4 by means of the pillars 63 and the screws 64. Similarly the time scale plate 65 is secured in a raised position above the face plate 4 by means of the pillars 66 and the screws 67.

Figure 13:
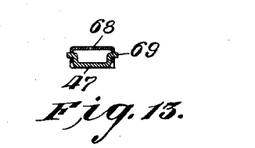
Figure 13 is a sectional view taken on line XIII—XIII of Figure 7. All elevations are shown as viewed from the front.

The arm 47, which constitutes part of the speed regulator, has attached to it the thumb clamp 68 (Figs. 5, 7 and 13), which is supported at 69 in such a manner that when the outer end of the said thumb clamp and the outer end of the speed regulator are pressed together between the thumb and forefinger the resulting pressure of the end 68$^a$ of the said thumb clamp, acting on the member 54, will cause the members 46, 48, 54 and 55 to become temporarily locked together and incapable of relative angular motion. Under these circumstances any angular displacement communicated to the speed regulator will be accompanied by a corresponding angular displacement of the diaphragm regulator. When however the pressure of the thumb and forefinger is relieved, the pressure of the part 68$^a$ on the part 54 is also relieved, and the relative motion of the members 46, 48, 54 and 55 is not under constraint due to the thumb clamp 68.

The time scale plate 65 has engraved upon it the scale 70$^c$—70$^d$ (see Fig. 1), which is composed of three scale portions, 70$^a$—70$^b$, 70$^b$—70$^c$, and 70$^a$—70$^d$. The scale portion 70$^a$—70$^b$ is logarithmic with a constant —A, the value of the angle A being the same as that employed in determining the form of the slot portion 31$^a$—31$^b$. The numbers marked upon the scale portion 70$^a$—70$^b$ correspond to durations of automatically timed exposures which the speed regulating mechanism of the shutter is capable of controlling, in this particular case from 1/100 sec. to 1 sec. The scale portion 70$^a$—70$^d$ is a continuation of the logarithmic scale portion 70$^a$—70$^b$, the scale from 70$^b$ to 70$^d$ being a continuous logarithmic scale having a constant —A. The values indicated on the scale portion 70$^a$—70$^d$ are greater than the duration of the longest automatically timed exposure which the speed regulating mechanism of the shutter is capable of controlling. This scale portion 70$^a$—70$^d$ is for the purpose of increasing the usefulness of the shutter by enabling it to be used for the calculation of the durations of "bulb" and "time" exposures. The scale portion 70$^b$—70$^c$ contains the markings "B" and "T." The thumb clamp 68 has engraved upon it the speed indicator 71, which in conjunction with the scale 70$^c$—70$^d$ indicates the adjustment of the speed regulating mechanism of the shutter. The relative position of the speed indicator 71 and the logarithmic scale portion 70$^b$—70$^d$ is so arranged that correct durations of automatically timed exposures are shown when the speed indicator 71 is in alignment with any part of the scale portion 70$^a$—70$^b$. This is rendered possible by the fact that the constant of the said logarithmic scale portion is identical with the constant of the logarithmic motion of the speed indicator with respect to the duration of automatically timed exposures as determined by the form of the slot portion 31$^a$—31$^b$, both constants having the value —A. The markings "B" and "T" are so arranged that the speed indicator 71 cooperating with said markings will show when the speed control mechanism of the shutter is adjusted for "bulb" or "time" exposures, by coming into alignment with the marks "B" or "T" respectively. The precise position of the marks "B" and "T" will thus depend on the form of the slot portion $31^b$—$31^c$. It will be seen that when the speed indicator 71 is in alignment with the scale portion $70^a$—$70^b$ the stud 30 lies in the slot portion $31^a$—$31^b$. When the said speed indicator 71 is in alignment with the scale portion $70^b$—$70^c$ the stud 30 lies in the slot portion $31^b$—$31^c$.

Figure 1:
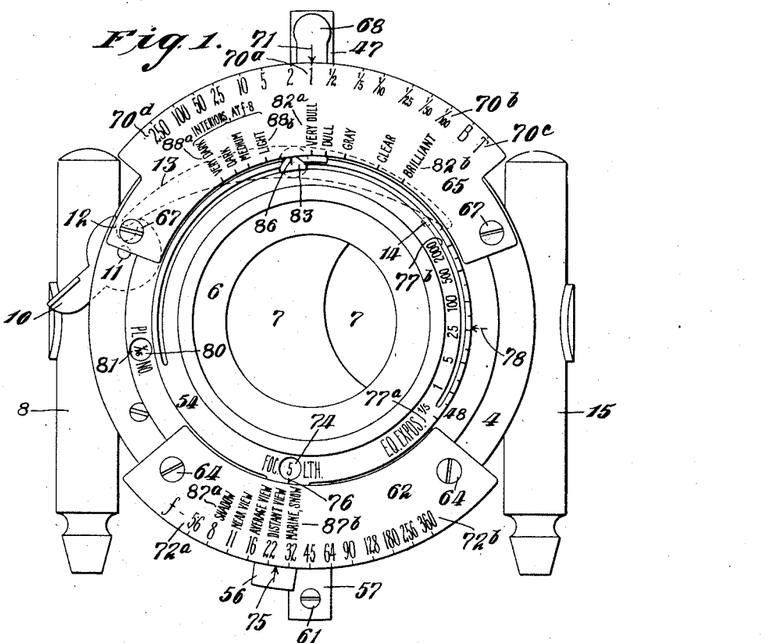
Figure 1 is a front elevation of a shutter of the type shown in U. S. patent to Brownell, No. 853,000, dated May 7, 1907, having the invention applied thereto.
Figure 2:
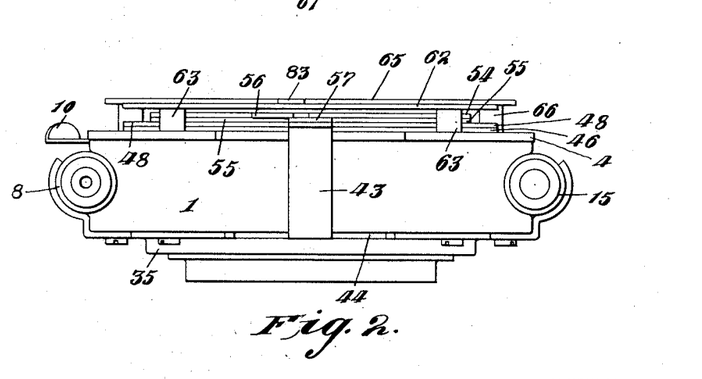
Figure 2 is a bottom plan view of the shutter shown in Figure 1.

The oscillatory plate 28 has a projecting portion $28^a$ (see Fig. 3) which is so arranged that when the speed indicator 71 is in alignment with the scale portion $70^a$—$70^d$ the said projecting portion $28^a$ cooperates with the pin 14 in such a manner that the mechanism operated by the finger piece 10 or lever 9 cannot be tripped and the shutter blades 7 cannot be operated. This provides a lock or check against premature or incorrect exposure, as will be explained later. It is to be noted that Figs. 1 and 3 show the pin 14 in the position it attains when deflected to the limit of its motion by the operation of the finger piece 10. The outer edge $28^b$ of the extended portion $28^a$ of the oscillatory plate 28 is so arranged that it just clears the pin 14 when the said oscillatory plate 28 is rotated and the pin 14 lies in its undeflected position.

The diaphragm scale plate 62 has marked upon it the diaphragm scale $72^a$—$72^b$ (see Fig. 1). This diaphragm scale is logarithmic in character, and has a constant $-2A$ if the $f$-system of diaphragms stops is to be indicated, or a constant $-A$ if the U. S. system of diaphragm stops is to be indicated. The diaphragm scale $72^a$—$72^b$ is shown in Fig. 1 as indicating $f$-values of diaphragm stops. The precise position of the scale $72^a$—$72^b$ on the diaphragm scale plate 62 is not important, but is preferably arranged as shown in Fig. 1.

The member 55 has marked upon it, preferably arranged as shown in Fig. 10, the logarithmic focal length scale $73^a$—$73^b$ which has a constant $-2A$. The member 54 has an aperture or window 74 which is so arranged that when the two members 54 and 55 are mounted in position on the shutter as shown in Fig. 1 the indications on the scale $73^a$—$73^b$ are disclosed through the window 74. The arm 56 has marked upon it the diaphragm indicator 75, preferably arranged as shown. A focal length indicator 76 is arranged opposite the middle of the aperture 74. The position of the focal length indicator 76 and the aperture 74 is so arranged that when the diaphragm indicator 75 is in alignment with the mark 16 on the diaphragm scale $72^a$—$72^b$ the diameter of the corresponding diaphragm aperture 33 is $\frac{1}{16}$ the value of the number indicated by the focal length indicator on the scale $73^a$—$73^b$. This method of locating the position of the focal length indicator 76 may be employed whether the $f$-system or the U. S. system of diaphragm stop notation is employed in the scale $72^a$—$72^b$.

The member 54 has marked upon it the logarithmic scale $77^a$—$77^b$ which has a constant $-A$. This scale $77^a$—$77^b$ will be referred to as the equivalent exposure scale. The equivalent exposure indicator 78 is marked upon the member 48 in such a position that it may be employed to indicate values on the equivalent exposure scale $77^a$—$77^b$. The method of determining the correct relative position of the equivalent exposure indicator 78 and the equivalent exposure scale $77^a$—$77^b$ will be explained later.

The member 46 has marked upon it the logarithmic scale $79^a$—$79^b$ (Fig. 7). This scale will be referred to as the plate number scale. The constant of the scale $79^a$—$79^b$ will depend on the system adopted for the numerical indication of the speed of sensitized surfaces, this scale $79^a$—$79^b$ being employed for indicating speeds of sensitized surfaces for which the shutter adjustments are compensated. In general, if the speed of sensitized surfaces is indicated by numbers proportional to the $n$th power of the speed, the constant of the plate number scale will be $-A/n$. The scale $79^a$—$79^b$, shown in Fig. 7, corresponds to plate numbers inversely proportional to the speed of sensitized surfaces, the system of numerical indication of speed being such that the numbers on this system indicate the duration of correct exposure of the corresponding sensitized surfaces when these surfaces are exposed at a diaphragm aperture of $f$-32 (i. e. U. S. 64), the subject photographed being an average landscape illuminated by strong sunlight. This system of plate numbers corresponds with the numbers given in the "Wellcome Photographic Exposure Record and Diary," 1916, Table B, column 1, and is well known to those skilled in the art. Since the numbers are inversely proportional to the first power of the speed of the corresponding sensitized surfaces it follows from the general rule given above that the constant of the plate number scale $79^a$—$79^b$ must be $+A$, since $n$ is equal to $-1$. The member 48 has an aperture or window 80, arranged so that when the two members 46 and 48 are in position on the shutter, as shown in Fig. 1, indications on the scale $79^a$—$79^b$ will be disclosed through the said aperture 80. The plate number indicator 81 is placed opposite the middle of the aperture 80, and is arranged to cooperate with the plate number scale $79^a$—$79^b$, indicating values thereon. The method of determining the correct relative position of the plate number indicator 81 and the plate number scale $79^a$—$79^b$ will be explained later.

The time scale plate 65 has marked upon it the descriptive illumination scale 82ª—82ᵇ, containing descriptive indications of the nature of the illumination of the subject to be photographed. The precise position of these descriptive indications will depend upon the exact meaning which is attached to them. If they are to have the same meaning as is attached to them in the construction and operation of the well known Autotime Scale manufacured by the Eastman Kodak Co., then the same descriptive indications are to be placed opposite the same numbers on the time scale as is done in the construction of the Autotime scale. This method has been adopted in locating the indications on the descriptive illumination scale 82ª—82ᵇ.

Figure 12:
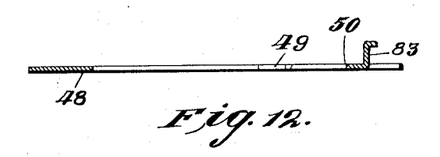
Figure 12 is a sectional view of the ring member shown in Figure 8, the section being taken on line XII—XII of said figure.

The member 48 has a tongue 83 cut in it, and this tongue 83 is bent into the form shown in Fig. 12. The two members 54 and 55 have slots 84 and 85 cut in them, which slots are so arranged with reference to the tongue 83 that when the three members 48, 54, and 55 are in position on the shutter, as indicated in the drawings, the tongue 83 may project up freely and without friction through the said slots 84 and 85. In this way the extremity of the tongue 83 is brought into view and made accessible from the outside of the shutter when all the members are in position, as shown in Fig. 1. The tongue 83 has marked upon it the descriptive illumination indicator 86, and the tongue 83 is bent so that the descriptive illumination indicator 86 may cooperate with, and indicate values on, the descriptive illumination scale 82ª—82ᵇ.

The method of locating the relative positions of the plate number indicator 81 and the plate number scale 79 may now be considered. Since the relative angular position of the two members 46 and 48 is maintained by the friction device consisting of the hooks 51 engaging with the bevelled edges 50, it is obvious that the relative angular position of the said two members 46 and 48 may be altered. Grasp the tongue 83 and the speed regulator in the two hands and alter the relative angular position of the two members 46 and 48 until the descriptive illumination indicator 86 is in radial alignment with the speed indicator 71. When this adjustment has been effected the plate number indicator 81 must indicate on the plate number scale 79ª—79ᵇ the plate number of that sensitized surface in conjunction with which the Autotime scale is designed to be used. This follows, since the alignment of the indications on the descriptive illumination scale 82ª—82ᵇ and the indications on the scale portion 70ª—70ᵇ is made to correspond with that of the Autotime scale, as explained above. The above described operation is therefore the test by means of which the correct relative position of the plate number indicator 81 and the plate number scale 79ª—79ᵇ must be determined.

The method of determining the correct relative position of the equivalent exposure indicator 78 and the equivalent exposure scale 77ª—77ᵇ may now be considered. It is first necessary to adopt some arbitrary unit of the actinic intensity of the light entering the camera, this being determined by the combined effect of the character of the subject being photographed and the illumination of the said subject. For this purpose the actinic intesity of the light passing through the diaphragm aperture, when an average view illuminated by clear strong sunlight is being photographed, may be taken as unity. This is the same actinic intensity of light as is employed in determining the plate numbers of sensitized surfaces in the system of plate numbers arbitrarily adopted. The plate numbers expressed in this arbitrary system are therefore numerically the same as the durations of correct exposures when the corresponding sensitized surfaces are exposed at an aperture $f$-32 (U. S., 64), and the actinic intensity of the light passing through the diaphragm aperture is unity. The equivalent exposures when sensitized surfaces are exposed in this manner must be unity, by the equation given in dealing with the theory of the invention, since the actinic intensity of the light entering the diaphragm aperture is unity, and the exposure is correct. Therefore to determine the correct relative position of the equivalent exposure indicator 78 and the equivalent exposure scale 77ª—77ᵇ, set the diaphragm indicator 75 at $f$-32 (U. S., 64), and set the speed indicator 71 opposite the same number on the time scale 70ᵇ—70ª as the plate number indicator 81 points to on the plate number scale 79ª—79ᵇ and locate the equivalent exposure indicator 78 opposite the number 1 on the equivalent exposure scale 77ª—77ᵇ. The equivalent exposure indicator 78 and the equivalent exposure scale 77ª—77ᵇ will then have the required relative position. This is evident, since the adjustment of the shutter obviously conforms to the conditions expressed by the equation given in dealing with the theory of the invention.

The diaphragm scale plate 62 has marked upon it the descriptive subject scale 87ª—87ᵇ, which comprises descriptive indications referring to subjects which it may be desired to photograph. The precise position of the descriptive indications will depend upon the exact meaning which is assigned to them. It will be convenient to adopt the same meaning as is assigned to them in the construction and operation of the Autotime scale, and to place them in alignment with diaphragm values indicated on the diaphragm scale 72ª—72ᵇ which correspond with the diaphragm values with which they are placed in alignment in the construction of the Autotime scale. This method of locating the said descriptive indications has been adopted in Fig. 1.

The practical operation of the shutter may now be considered. Before using the shutter two preliminary adjustments are necessary. First, the relative angular position of the two members 54 and 55 is adjusted by means of the diaphragm regulator and the arm 56 so that the focal length indicator 76 points to the value on the focal length scale 73$^a$—73$^b$ corresponding with the focal length of the lens which is to be used with the shutter. If, after this preliminary adjustment has been effected, the diaphragm regulator be moved so as to cause an alteration in the area of the diaphragm aperture 33, the diaphragm indicator 75 will move with the diaphragm regulator, since the relative angular position of the two members 54 and 55 remains fixed under the control of the friction device previously described. Under these conditions the diaphragm indicator 75 will indicate correct diaphragm values on the diaphragm scale 72$^a$—72$^b$ over the whole range of possible adjustment of the area of the diaphragm aperture 33. No further adjustment of the relative angular position of the members 54 and 55 will be necessary as long as the distance from the diaphragm aperture to the sensitized surface remains approximately the same as the focal length of the lens for which the first compensating adjustment, described above, was made. If however, nearby objects are to be photographed, necessitating an increase in the distance from the sensitized surface in order to secure sharp focussing, or if one combination of the lens is to be used alone, resulting in a greater equivalent focus, then the relative angular position of the members 54 and 55 will have to be adjusted until the focal length indicator 76 points to the value on the focal length scale 73$^a$—73$^b$ corresponding to the actual working distance of the diaphragm aperture from the sensitized surface. Whenever the value indicated by the focal length indicator on the scale 73$^a$—73$^b$ corresponds to the actual working distance of the diaphragm aperture from the sensitized surface the diaphragm indicator 75 will indicate true diaphragm values on the diaphragm scale 72$^a$—72$^b$ over the whole range of its possible motion.

The second preliminary adjustment consists of altering the relative angular position of the members 46 and 48 by means of the speed regulator and the tongue 83 until the plate number indicator 81 indicates on the plate number scale 79$^a$—79$^b$ the value of the plate number of the sensitized surface which it is desired to expose. Any subsequent alteration of the speed adjustment of the shutter by means of the speed regulator will not alter the relative angular position of the two members 46 and 48, since their relative angular position is maintained fixed by means of the friction device previously described.

These two preliminary compensating adjustments having been effected, the shutter is ready for practical operation.

The operator now has the choice of two independent methods of effecting the proper adjustment of the regulators of the shutter in order to secure correct exposure of the sensitized surface, the first method involving the use of the descriptive scales 87$^a$—87$^b$ and 82$^a$—82$^b$, and the second involving the use of the equivalent exposure scale 77$^a$—77$^b$.

Adopting the first method of operation, the diaphragm regulator is rotated until the diaphragm indicator 75 is in radial alignment with the descriptive indication on the descriptive scale 87$^a$—87$^b$, corresponding to the subject which it is desired to photograph. The speed regulator is then adjusted until the descriptive illumination indicator 86 is in radial alignment with the descriptive indication on the descriptive scale 82$^a$—82$^b$ corresponding to the illumination of the subject which it is desired to photograph. As a result of these two adjustments the operator has secured one particular combination of adjustments of the speed regulator and diaphragm regulator which will enable him to secure correct exposure of the sensitized surface. If now the ends of the thumb clamp 68 and the speed regulator be pressed together between the thumb and forefinger, and the said speed regulator be swung into any new angular position, the diaphragm regulator will experience a similar angular displacement, since the action of the thumb clamp 68 prevents any relative angular motion of the speed regulator and diaphragm regulator, as has been explained. It may readily be seen that, provided the speed indicator 71 remains adjacent to the scale portion 70$^a$—70$^b$ during this operation, this similar angular displacement communicated to the speed regulator and diaphragm regulator will not alter the amount of light which would be admitted to the camera if the shutter blades were operated. This is due to the fact that the speed regulator has a logarithmic motion with respect to the duration of automatically timed exposures, and the diaphragm regulator has a logarithmic motion with respect to the area of the diaphragm aperture, and that the constants of these two logarithmic motions are equal in magnitude but opposite in sign. Thus the change in the amount of light admitted to the camera due to the change in duration of exposure will be exactly compensated for by the change in the area of the diaphragm aperture. It will thus be seen that if any one particular combination of adjustments of the speed regulator and diaphragm regulator which will admit the proper amount of light to the camera can be effected, all other combinations of adjustments of the speed regulator and diaphragm regulator which will admit the same amount of light become immediately available by means of a simple mechanical operation.

If when the speed and diaphragm regulation is being altered under the control of the thumb clamp 68 the speed indicator 71 moves to a position to the right of the point $70^b$, this will indicate that the shutter is incapable of controlling an automatically timed exposure of sufficiently short duration to produce correct exposure in conjunction with the corresponding diaphragm aperture. If on the other hand the speed indicator 71 moves to a position to the left of the point $70^a$ this will indicate that the shutter is incapable of controlling an automatically timed exposure of sufficiently long duration to produce correct exposure in conjunction with the corresponding diaphragm aperture. When the speed indicator 71 is moved to the left of the point $70^a$ under the control of the thumb clamp 68 in the manner described, the operator must observe the reading of the speed indicator 71 on the scale portion $70^a$—$70^d$ then release the thumb clamp 68 and rotate the speed regulator until the speed indicator 71 is opposite the mark "B" or "T", leaving the diaphragm adjustment undisturbed during this operation, and then give the sensitized surface a "bulb" or "time" exposure of duration corresponding to the previously observed reading of the speed indicator 71 on the scale portion $70^a$—$70^d$. This will result in the correct amount of light being admitted to the camera. It will thus be seen that the scale portion $70^a$—$70^d$, which is a continuation of the logarithmic scale portion $70^a$—$70^b$, enables the operator to determine the correct duration of "bulb" or "time" exposures by means of a simple mechanical operation.

Should the operator, while changing the adjustment of the speed and diaphragm regulators under the control of the thumb clamp 68, cause the speed indicator 71 to move to the left of the point $70^a$, and, without observing that this has happened, attempt to effect an automatically timed exposure of the shutter while the speed indicator is in this position, under the impression that the shutter is in adjustment for automatically timed exposures, the projection $28^a$ on the oscillatory plate 28, by interfering with the movement of the pin 14, will prevent the operation of the mechanism that actuates the shutter blades. This projection $28^a$ thus forms a safety check or lock, preventing incorrect operation of the shutter in the manner described.

The second method of operation of the shutter will now be considered: If an examination be made of the manner in which the several scales and indicators are arranged on the shutter, it will be seen that they constitute a special form of slide rule, in which the scales $70^b$—$70^d$ and $72^a$—$72^b$ are fixed, and in which all the other scales and all the indicators are movable. These scales and indicators have been so arranged that, adopting the notation employed in the equation given in dealing with the general theory of this invention, the value of $T$ is indicated on the time scale $70^b$—$70^d$, a value inversely proportional to $D$ is indicated on the diaphragm scale $72^a$—$72^b$, the value of $N$ is indicated on the plate number scale $79^a$—$79^b$, the value of $L$ is indicated on the focal length scale $73^a$—$73^b$, and the value of the equivalent exposure $TD^2/KNL^2$ is indicated on the scale $77^a$—$77^b$. Since the quantities $D$ and $L$ appear with the exponent 2 in the expression for the equivalent exposure, the logarithmic constants of the corresponding scales are numerically double the value of the constants of the scales corresponding to $T$ and $N$. Now by the equation which determines the conditions of correct exposure it is seen that the equivalent exposure must be made the reciprocal of the actinic intensity of the light entering the camera in order to secure correct exposure. Therefore to correctly adjust the shutter by means of the equivalent exposure scale $77^a$—$77^b$, the operator must estimate the value of the actinic intensity of the light entering the camera in terms of the arbitrary unit chosen, and then set the indicator 78 opposite the value on the scale $77^a$—$77^b$ which represents the reciprocal of this actinic intensity of light by relative movement of the speed and diaphragm regulators. (For instance, if the actinic intensity of light is estimated to be $\frac{1}{10}$ the value of the standard intensity, the indicator 78 must be set in alignment with the division marked 10 on the equivalent exposure scale $77^a$—$77^b$.) The shutter will then be in adjustment to effect a correct exposure, and any other possible combination of adjustments which will effect the same equivalent exposure may immediately be obtained by operating the speed and diaphragm regulators under the control of the thumb clamp 68. In the event of the speed indicator 71 passing to the left of the position $70^a$ or to the right of the position $70^b$, when so operated, the same method of procedure is to be adopted as was explained in describing the first method of operation of the shutter.

The advantage of having the two methods of securing correct adjustment of the regulators combined on one shutter is that when the shutter is to be used by an operator unskilled in the use of cameras, correct settings of the shutter regulators may be effected by means of the descriptive scales 82$^a$—82$^b$ and 87$^a$—87$^b$, and then the corresponding indications on the equivalent exposure scale noted. In this way an untrained operator may rapidly acquire skill in judging the combined effect of illumination and character of subject in determining the corresponding correct equivalent exposure, and so may acquire skill in setting the regulators by means of the equivalent exposure scale 77$^a$—77$^b$. This will result in greater quickness in securing correct adjustment of the shutter, since in general only one of the two regulators of the shutter need be operated in order to secure any given adjustment of the equivalent exposure indicator 78 relative to the equivalent exposure scale 77$^a$—77$^b$. The combination of the two methods of adjustment in the one instrument thus constitutes a simple means of training the judgment of the unskilled operator.

One great advantage of the second method of operation as compared with the first may be mentioned here. The range of conditions as regards subject and illumination which may be dealt with by means of the descriptive scales 82$^a$—82$^b$ and 87$^a$—87$^b$ is necessarily limited by the range of the descriptions contained in the said descriptive scales, whereas the possible range of usefulness of the equivalent exposure scale 77$^a$—77$^b$ is practically unlimited. However, it should be noted in this connection that the possible range of the descriptive illumination scale 82$^a$—82$^b$ may be considerably extended by the present invention, by including further descriptive indications, such as those shown on the scale 88$^a$—88$^b$, which contains descriptive indications referring to the illumination of interiors. Since the scale portion 70$^a$—70$^d$ may be extended practically indefinitely towards the left, and since the use of the scale 88$^a$—88$^b$ depends upon this scale portion 70$^a$—70$^d$, it follows that a very considerable range of descriptive indications, such as those shown on the scale 88$^a$—88$^b$, may be included on the scale plate 65.

The following may be mentioned as amongst the more important advantages of the present invention:

First. If the operator can estimate correctly the value of the actinic intensity of light in terms of an arbitrary standard, the subsequent setting of the regulators of the shutter to secure correct exposure may be accomplished rapidly and with certainty, by the simple operation of mechanical parts.

Second. When the operator has effected any combined adjustment of the speed and diaphragm regulators which will give a correct exposure of the sensitized surface, all other possible combinations of adjustments of the speed and diaphragm regulators which will give the same exposure become immediately available by the simple operation of the said regulators under the action of a thumb clamp, the operator not being restricted to those particular settings of the said regulators which correspond with particular graduations on their respective scales. The range of combined adjustments of the two regulators which will correspond with correct exposure is limited by the limits of the range of possible adjustment of the diaphragm aperture and by the maximum speed at which the shutter blades can be operated, but not by any maximum duration of exposures, since the scale portion 70$^a$—70$^d$ may be continued practically indefinitely to the left.

Third. When the operator wishes to expose sensitized surfaces having different speed characteristics, the difference in the speed of these surfaces may be exactly compensated for by having the second preliminary adjustment correspond before each exposure with the speed characteristic of the surface to be exposed, the shutter being then operated in precisely the same manner with all sensitized surfaces. The difference in the speeds of sensitized surfaces is thus compensated for by a simple mechanical operation. Since in general most operators do not frequently change from the use of sensitized surfaces having one speed characteristic to those having another, the semi-permanent character of this second preliminary adjustment is of considerable advantage, the operator not having to remember before each exposure the speed characteristic of the surface about to be exposed.

Fourth. By means of the first preliminary adjustment the diaphragm indicator may be made to indicate correct diaphragm apertures corresponding to any distance of the diaphragm from the sensitized surface. One advantage of this is that the manufacturer may put the shutter on the market with the diaphragm graduations marked on it, and by means of this simple preliminary adjustment the operator may, with the aid of a single diaphragm scale, obtain correct diaphragm indications corresponding to any number of lenses of different focal lengths. Also the difficulty of obtaining correct diaphragm indications when nearby objects are being focussed is eliminated, by having the first preliminary adjustment correspond with the actual working distance of the diaphragm aperture from the sensitized surface. In connection with this latter point, it will be an advantage to have the camera supplied with a distance scale arranged alongside the focussing scale, upon which the actual distance of the diaphragm aperture from the sensitized surface may be registered. If this arrangement is adopted, correct diaphragm adjustments will always be secured, provided the focal length indicator is set to a value on the focal length scale corresponding with the value indicated on the distance scale.

Fifth. In the present invention all systems of notation indicating diaphragm values may be employed with equal ease, since the numerical values of the diaphragm apertures are never required in adjusting the regulators for correct exposure. (In fact, the numerical graduations indicating diaphragm apertures and durations of "instantaneous" exposures might be omitted entirely from the shutter, without interfering with its successful operation.)

Obviously the present invention is susceptible of a wide range of modification, as parts may be omitted, parts added, and parts rearranged or differently constructed without altering the character or scope of the invention.

In this connection one particular modification deserves attention. If the scale 77ª—77ᵇ be marked with the reciprocals of the values shown in Figs. 1 and 8, and described, the indicator 78 will then register the value of the actinic intensity of light for which the shutter is in correct adjustment. To secure correct adjustment of the regulators the operator will then have to adjust the indicators 78 so that it will register a value corresponding to the actinic intensity of light coming from the subject to be photographed. Although the use of an actinic intensity of light scale of this character would involve a simpler mental process on the part of the operator, the majority of skilled photographers are accustomed to the other method of looking at the problem, the common practice being to estimate that the character and illumination of the subject require an exposure which is reckoned as a multiple of some normal exposure, which will give correct exposure for certain arbitrarily chosen normal conditions of subject and illumination. For this reason the scale 77ª—77ᵇ is shown as an equivalent exposure scale, and not as an actinic intensity of light scale, although either scale would be perfectly satisfactory in operation. It should be noted that in the case of either of these scales the values indicated may be regarded as a series of fractions, of which one member is the equivalent exposure, and the other member is unity. The one scale is obtained from the other by reversing the position of numerator and denominator.

In the foregoing description and in the appended claims, the various scales are sometimes referred to as logarithmic scales and the motions of different movable parts with relation to certain of the variable factors involved are described as logarithmic motions, but I do not intend by this to indicate that these scales and motions need be necessarily strictly logarithmic throughout their entire range. In many cases, if the various scales and motions are logarithmic or approximately logarithmic in character throughout their principal portions, the objects of the invention will be in a substantial measure achieved and I intend to include such constructions as within the scope of my invention.

Having thus described my invention, I claim:

1. In a photographic shutter, the combination of shutter mechanism, control means for varying the speed of operation of the shutter, a rotary member for actuating said control means having logarithmic motion with relation to the speed of the shutter, an adjustable diaphragm, and a rotary member for adjusting said diaphragm having logarithmic motion with relation to the diaphragm aperture.

2. In a photographic shutter, the combination of shutter mechanism, control means for varying the speed of operation of the shutter, an iris diaphragm, and concentric rotatable rings for actuating said control means and diaphragm respectively, the ring for actuating said control means having logarithmic motion with respect to the speed of the shutter and the ring for actuating said diaphragm having logarithmic motion with respect to the diaphragm aperture.

3. In a photographic shutter, the combination of shutter mechanism, control means for varying the speed of operation of the shutter, an iris diaphragm, concentric rotatable rings for actuating said control means and diaphragm respectively, the ring for actuating said control means having logarithmic motion with respect to the speed of the shutter and the ring for actuating said diaphragm having logarithmic motion with respect to the diaphragm aperture, and logarithmic scales cooperating with each of said rings for indicating the adjustments thereof.

4. In a photographic shutter, the combination of shutter mechanism, a speed regulator for determining the speed of operation of the shutter, said speed regulator having logarithmic motion with respect to the speed of the shutter, an adjustable diaphragm, a diaphragm regulator for the same having logarithmic motion with relation to the diaphragm aperture, said speed and diaphragm regulators being independently movable, and means for temporarily establishing a connection between the same, whereby they may be moved as a unit.

5. In a photographic shutter, the combination of shutter mechanism, control means for varying the speed of operation of the shutter, an adjustable diaphragm, concentric rotatable rings for actuating said control means and said diaphragm respectively, said rings being independently rotatable, and a clamp for connecting said rings together, whereby they may be rotated together as a unit to simultaneously but inversely vary the speed of the shutter and diaphragm aperture.

6. In a photographic shutter, the combination of shutter mechanism, control means for varying the speed of operation of the shutter, an adjustable diaphragm, concentric rotatable rings for actuating said control means and said diaphragm respectively, one of said rings having logarithmic motion with respect to the speed of the shutter and the other of said rings having logarithmic motion with respect to the area of the diaphragm aperture, the constants of said logarithmic motions being equal in amount but opposite in sign, said rings being independently rotatable, and means for temporarily establishing a connection between the same whereby they may be rotated as a unit.

7. In a photographic shutter, the combination of shutter mechanism, control means for varying the speed of operation of the shutter, and actuating means for said control means including a movable member having a cam surface cooperating with an element of the shutter control means, said cam surface being of such form that the motion of said movable member will be logarithmic with respect to the variations in the speed of the shutter produced by such motion.

8. In a photographic shutter, the combination of shutter mechanism, control means for varying the speed of operation of the shutter, and actuating means for said control means including a movable member having a cam slot therein cooperating with a projection on the shutter control means, said slot comprising a portion shaped to actuate said shutter control means to vary the duration of automatically timed exposures, and having another portion permitting movement of said ring without affecting the speed of the shutter, said first named slot portion being of such form that the motion of said movable member is logarithmic with respect to the variation in duration of automatically timed exposures.

9. In a photographic shutter, the combination of shutter mechanism, control means for the same the movement of which controls the speed of automatic operation of the shutter and also determines the action of the shutter to produce "bulb" or "time" exposures, and a movable actuating member for actuating said control means, said movable actuating member having logarithmic motion with relation to the speed of the shutter within the range of movement of the control means corresponding with the production by the shutter of automatically timed exposures.

10. In a photographic shutter, the combination of shutter mechanism, control means for varying the speed of operation of the shutter in producing automatically timed exposures and for determining the action of said shutter to produce "bulb" or "time" exposures, and a movable actuating member for said control means including a three-part cam cooperating with an element of said control means, one part of said cam actuating said control means to determine the duration of automatically timed exposures, a second part of said cam actuating said control means to determine the action of the shutter to produce "bulb" or "time" exposures and the third part of said cam permitting free movement of said member without actuation of said control means.

11. In a photographic shutter, the combination of shutter mechanism, control means for the same, a regulator for actuating said control means, the movement of which through one part of its range controls the speed of automatic operation of the shutter and the movement of which through a second part of its range determines the action of the shutter to produce "bulb" or "time" exposures, the movement of the regulator through a third part of its range having no effect upon the operation of the shutter, and a scale cooperating with said regulator, said scale having three portions corresponding with the three parts of the range of movement of the regulator, the first of which scale portions bears indicia showing the varying durations of automatic exposures produced by the shutter, the second portion of the scale indicating the positions of the regulator corresponding with the production of "bulb" or "time" exposures and the third portion of the scale containing indicia showing durations of "time" exposures.

12. In a photographic shutter, the combination of shutter mechanism, control means for the same, a regulator for actuating said control means the movement of which through one part of its range controls the speed of automatic operation of the shutter and the movement of which through a second part of its range determines the action of the shutter to produce "bulb" or "time" exposures, the movement of the regulator through a third part of its range having no effect upon the operation of the shutter, and a scale cooperating with said regulator, said scale having three portions corresponding with the three parts of the range of movement of the regulator, the first of which scale portions bears indicia showing the varying durations of automatic exposures produced by the shutter, the second portion of the scale indicating the positions of the regulator corresponding with the production of "bulb" or "time" exposures and the third portion of the scale containing indicia showing durations of "time" exposures, the motion of said regulator in the first named part of its range being logarithmic with respect to the speed of the shutter and said first and third named scale portions being logarithmic scales.

13. In a photographic shutter, the combination of shutter mechanism, control means for the same, a regulator for actuating said control means which through a part of its range of movement regulates the speed of automatic operation of the shutter and through another part of its range has a movement independent of the shutter control means, and a scale cooperating with said regulator having a scale portion indicating the durations of automatically timed exposures and another scale portion indicating durations of "time" exposures.

14. In a photographic shutter, the combination of shutter mechanism, control means for the same, a regulator for actuating said control means, the movement of which regulates through a part of its range the speed of automatic operation of the shutter, said regulator having logarithmic motion with respect to the speed of the shutter during said range, said regulator having a further range of movement independent of the speed control means of the shutter, and a logarithmic scale cooperating with said regulator having, corresponding with the first-named range of movement of said regulator a portion indicating the duration of automatically timed exposures and, corresponding with the free movement of said regulator, a second portion indicating durations of "time" exposures.

15. In a photographic shutter, the combination of shutter mechanism, control means for varying the speed of operation of the shutter, an iris diaphragm, a diaphragm regulator, and a plate number indicating scale and indicator for compensating for different plate speeds.

16. In a photographic shutter, the combination of shutter mechanism, control means for varying the speed of operation of the shutter, a speed regulator for actuating said control means having logarithmic motion with relation to the speed of the shutter, an iris diaphragm, a diaphragm regulator having logarithmic motion with relation to the diaphragm aperture and a logarithmic plate number scale and indicator for compensating for different plate speeds.

17. In a photographic shutter, the combination of shutter mechanism, control means for varying the speed of operation of the shutter, a speed regulator for actuating said control means, and a plate number scale movable with said speed regulator.

18. In a photographic shutter, the combination of shutter mechanism, control means for varying the speed of operation of the shutter, a movable actuating member for said control means, and a second member movable with relation to said actuating member, one of said members carrying a plate number scale and the other of said members carrying a plate number indicator cooperating therewith.

19. In a photographic shutter, the combination of shutter mechanism, control means for varying the speed of operation of the shutter, a speed regulator for actuating said control means, a plate number scale movable with said speed regulator, a member movable with relation to said speed regulator and a plate number indicator on said member cooperating with said plate number scale, said member having a connection with said speed regulator permitting adjustment relative thereto but such that said member and regulator normally move together when said speed regulator is moved.

20. In a photographic shutter, the combination of shutter mechanism, control means for varying the speed of operation of the shutter a speed regulator for actuating said control means, a plate number scale movable with said speed regulator, a descriptive light scale, and a movable indicator member carrying two indicators, one of which cooperates with said plate number scale and the other of which cooperates with the descriptive light scale.

21. In a photographic shutter, the combination of shutter mechanism, control means for varying the speed of operation of the shutter, a pair of movable rings one of which is connected to said control means, a plate number scale on one of said rings, and a plate number indicator on the other ring cooperating with said plate number scale.

22. In a photographic shutter, the combination of shutter mechanism, control means for varying the speed of operation of the shutter, a movable ring connected to said control means, a plate number scale on said ring, and an indicator ring having a plate number indicator thereon cooperating with said plate number scale, said indicator ring having frictional engagement with said movable ring, whereby it will normally move with the same but is capable of adjustment with relation thereto to indicate different plate numbers.

23. In a photographic shutter, the combination of shutter mechanism, control means for varying the speed of operation of the shutter, a movable ring connected to said control means, a plate number scale on said ring, an indicator ring having a plate number indicator therein cooperating with said plate number scale, said indicator ring having frictional engagement with said movable ring, whereby it will normally move with the same but is capable of adjustment with relation thereto to indicate different plate numbers, a descriptive light scale, and a second indicator on said indicator ring cooperating with said descriptive light scale.

24. In a photographic shutter, the combination of shutter mechanism, control means for varying the speed of operation of the shutter, a movable ring connected to said control means, a plate number scale on said ring, an indicator ring having a plate number indicator thereon cooperating with said plate number scale, said indicator ring having frictional engagement with said movable ring, whereby it will normally move with the same but is capable of adjustment with relation thereto to indicate different plate speeds, a scale indicating durations of exposure, an indicator on said movable ring cooperating with said scale, a descriptive light scale, and a second indicator on said indicator ring cooperating with said descriptive light scale.

25. In a photographic shutter, the combination of shutter mechanism, control means for varying the speed of operation of the shutter together with an adjustable diaphragm for regulating the amount of light admitted to the camera, a pair of concentric rings having frictional engagement with each other whereby they will normally move together, but are capable of relative adjustment by the application of a force sufficient to overcome the frictional resistance, means connecting one of said rings to said control means whereby movement of said ring actuates said control means and means connecting said other ring with said adjustable diaphragm whereby movement of said other ring controls the opening of said diaphragm.

26. In a photographic shutter, the combination of shutter mechanism, control means for varying the speed of operation of the shutter together with an adjustable diaphragm for regulating the amount of light admitted to the camera, a pair of concentric rings having means frictionally to engage each other comprising spring fingers attached to one ring and engaging a portion of the other ring, whereby they will normally move together, but are capable of relative adjustment by the application of a force sufficient to overcome the frictional resistance, means connecting one of said rings to said control means whereby movement of said ring actuates said control means and means connecting said other ring with said adjustable diaphragm whereby movement of said other ring controls the opening of said diaphragm.

27. In a photographic shutter, the combination of a movable regulator and a pair of rings associated therewith, one of said rings being slotted to form arc-shaped spring fingers carrying shoes frictionally engaging the other ring.

28. In a photographic shutter, the combination of a movable regulator and a pair of concentric rings associated therewith, said rings having frictional engagement with each other whereby they will normally move together but are capable of relative adjustment, one of said rings having a scale thereon and the other of said rings having an indicator cooperating with said scale.

29. In a photographic shutter, the combination of shutter mechanism, control means for varying the speed of operation of the shutter, a regulator for actuating said control means having logarithmic motion with relation to the speed of the shutter, and a descriptive light scale cooperating with said regulator.

30. In a photographic shutter, the combination of shutter mechanism, control means for varying the speed of operation of the shutter, a regulator for actuating said control means and a logarithmic time scale and a descriptive light scale cooperating with said regulator.

31. In a photographic shutter, the combination of shutter mechanism, control means for varying the speed of operation of the shutter, a movable speed regulator for actuating said control means, said speed regulator having a range of movement beyond that corresponding with the limits of duration of automatically timed exposures, and a scale by which the position of said regulator within such extended range of movement may be read to show durations of "time" exposures.

32. In a photographic shutter, the combination of shutter mechanism, control means for varying the speed of operation of the shutter, a movable speed regulator for actuating said control means, said speed regulator having a range of movement beyond that corresponding with the limits of duration of automatically timed exposures, and a descriptive light scale corresponding with said extended range of movement of said regulator.

33. In a photographic shutter, the combination of shutter mechanism, control means for varying the speed of operation of the shutter, a movable speed regulator for actuating said control means, said speed regulator having a range of movement beyond that corresponding with the limits of duration of automatically timed exposures, and a logarithmic time scale and a descriptive light scale corresponding with said extended range of movement of said regulator.

34. In a photographic shutter, the combination of shutter mechanism, control means for varying the speed of operation of the shutter, a speed regulator for actuating said control means, movable through a range corresponding with the variations of automatically timed exposures and through a further range, a descriptive light scale cooperating with said regulator to indicate the movements thereof during such first named range of movement and a second descriptive light scale corresponding with the second named range of movement of said regulator.

35. In a photographic shutter, the combination of shutter mechanism, control means for varying the speed of operation of the shutter, a movable member for actuating said control means, said member having a range of movement within which it produces variations in the duration of automatically timed exposures and having an additional range of movement, and means for preventing the actuation of the shutter mechanism to make an exposure when said member occupies a position within the limits of said additional range of movement.

36. In a photographic shutter, the combination of shutter mechanism, control means for varying the speed of operation of the shutter, a movable member for actuating said control means, said movable member having a range of movement within which it produces variable automatically timed exposures and an additional range of movement, a scale indicating durations or automatically timed exposures corresponding with the movements of said movable member during such first range of movement and having a portion indicating durations of time exposures corresponding with the movements of said movable member during said additional range of movement and means for preventing the actuation of the shutter to produce automatically timed exposures when said member occupies a position within the limits of said additional range of movement.

37. In a photographic shutter, the combination of shutter mechanism, control means for varying the speed of operation of the shutter, a projection on a portion of said control means, a rotatable plate having a cam slot therein cooperating with said projection, said cam slot having a portion producing movement of said control means so as to vary the duration of automatically timed exposures, said slot also having a portion in which said projection may freely move without actuation of said control means, said plate having a portion co-operating with said shutter mechanism to prevent the actuation of the shutter to produce automatically timed exposures when said projection is within the inactive portion of said cam slot.

38. In a photographic shutter, the combination of shutter mechanism, control means for varying the speed of operation of the shutter, a movable speed regulator connected to said control means, an adjustable diaphragm, a movable diaphragm regulator for actuating said diaphragm to vary the aperture, one of said regulators carrying a scale representing values of a function of the actinic intensity of light and the other of said regulators carrying an indicator cooperating with said scale, whereby the adjustment of said indicator with relation to said scale, a correct relationship of diaphragm aperture and exposure may be determined.

39. In a photographic shutter, the combination of a movable regulator for varying the duration of exposure, a movable regulator for varying the diaphragm aperture, one of said regulators carrying a scale representing values of a function of the actinic intensity of light and the other of said regulators carrying an indicator cooperating with said scale, whereby by the adjustment of said indicator with relation to said scale a correct relationship of diaphragm aperture and exposure may be determined, and means for establishing a temporary connection between said regulators, whereby, they may be moved as a unit.

40. In a photographic shutter, the combination of a movable regulator for varying the duration of exposure, a movable regulator for varying the diaphragm aperture, one of said regulators carrying a scale representing values of a function of the actinic intensity of light and the other of said regulators carrying an indicator cooperating with said scale, whereby by the adjustment of said indicator with relation to said scale, a correct relationship of diaphragm aperture and exposure may be determined, a time scale cooperating with said speed regulator and a diaphragm aperture scale cooperating with said diaphragm regulator.

41. In a photographic shutter, the combination of a movable regulator for varying the duration of exposure, a movable regulator for varying the diaphragm aperture, one of said regulators carrying a scale representing values of function of the actinic intensity of light and the other of said regulators carrying an indicator cooperating with said scale, whereby by the adjustment of said indicator with relation to said scale a correct relationship of diaphragm aperture and exposure may be determined, a time scale cooperating with said speed regulator and a diaphragm aperture scale cooperating with said diaphragm regulator, all of said scales being logarithmic.

42. In a photographic shutter, the combination of a movable regulator for determining the duration of exposure, said regulator having a range of movement producing variable automatically timed exposures and an additional range of free movement independent of the speed control mechanism of the shutter, a scale for calculating durations of time exposures corresponding to the range of free movement of said speed regulator, and a movable regulator for varying the diaphragm aperture, one of said regulators carrying a scale representing values of a function of actinic intensity of light and the other of said regulators carrying an indicator cooperating with said scale.

43. In a photographic shutter, the combination of a speed regulator having logarithmic motion with respect to the duration of automatically timed exposures, a diaphragm regulator having logarithmic motion with relation to the diaphragm aperture, a logarithmic scale on one of said regulators representing values of a function of the actinic intensity of light and an indicator on the other regulator cooperating with said scale, one of said regulators carrying means for compensating for plate speeds and the other of said regulators carrying means for compensating for focal lengths.

44. In a photographic shutter, the combination of a speed regulator having logarithmic motion with respect to the duration of automatically timed exposures, a diaphragm regulator having logarithmic motion with relation to the diaphragm aperture, a logarithmic scale on one of said regulators representing values of a function of the actinic intensity of light and an indicator on the other regulator cooperating with said scale, said speed regulator comprising two relatively movable members, one of which carries a logarithmic plate number scale, and the other of which carries an indicator cooperating therewith, said diaphragm regulator comprising two relatively movable members, one of which carries a logarithmic focal length scale and the other of which carries an indicator cooperating therewith.

45. In a photographic shutter, the combination of a descriptive light scale, a movable member having an indicator thereon cooperating with said descriptive light scale, a descriptive subject-matter scale, a movable member having an indicator thereon cooperating with said descriptive subject-matter scale, one of said members having thereon a scale representing values of a function of the actinic intensity of light and an indicator on the other of said members cooperating with said last-named scale.

46. In a photographic shutter, the combination of a descriptive light scale, a movable member having an indicator thereon cooperating with scale, a logarithmic diaphragm aperture scale, a movable member having an indicator thereon cooperating with said diaphragm aperture scale, one of said movable members having a scale thereon representing values of a function of the actinic intensity of light and the other of said members having an indicator thereon cooperating with said last-named scale.

47. In a photographic shutter, the combination of a movable regulator for varying the duration of exposure, a movable regulator for varying the diaphragm aperture, an equivalent exposure scale associated with one of said regulators and an indicator cooperating with said scale and associated with the other regulator.

48. In a photographic shutter, the combination of shutter mechanism, control means for carrying the speed of operation of the shutter, a speed regulator for actuating said control means having logarithmic motion with respect to the speed of the shutter, an adjustable diaphragm, and a diaphragm regulator having logarithmic motion with respect to the diaphragm aperture, one of said regulators having a logarithmic equivalent exposure scale associated therewith and the other of said regulators having associated therewith an indicator for indicating values on said equivalent exposure scale.

HEREWARD LESTER COOKE.